Patented Mar. 7, 1950

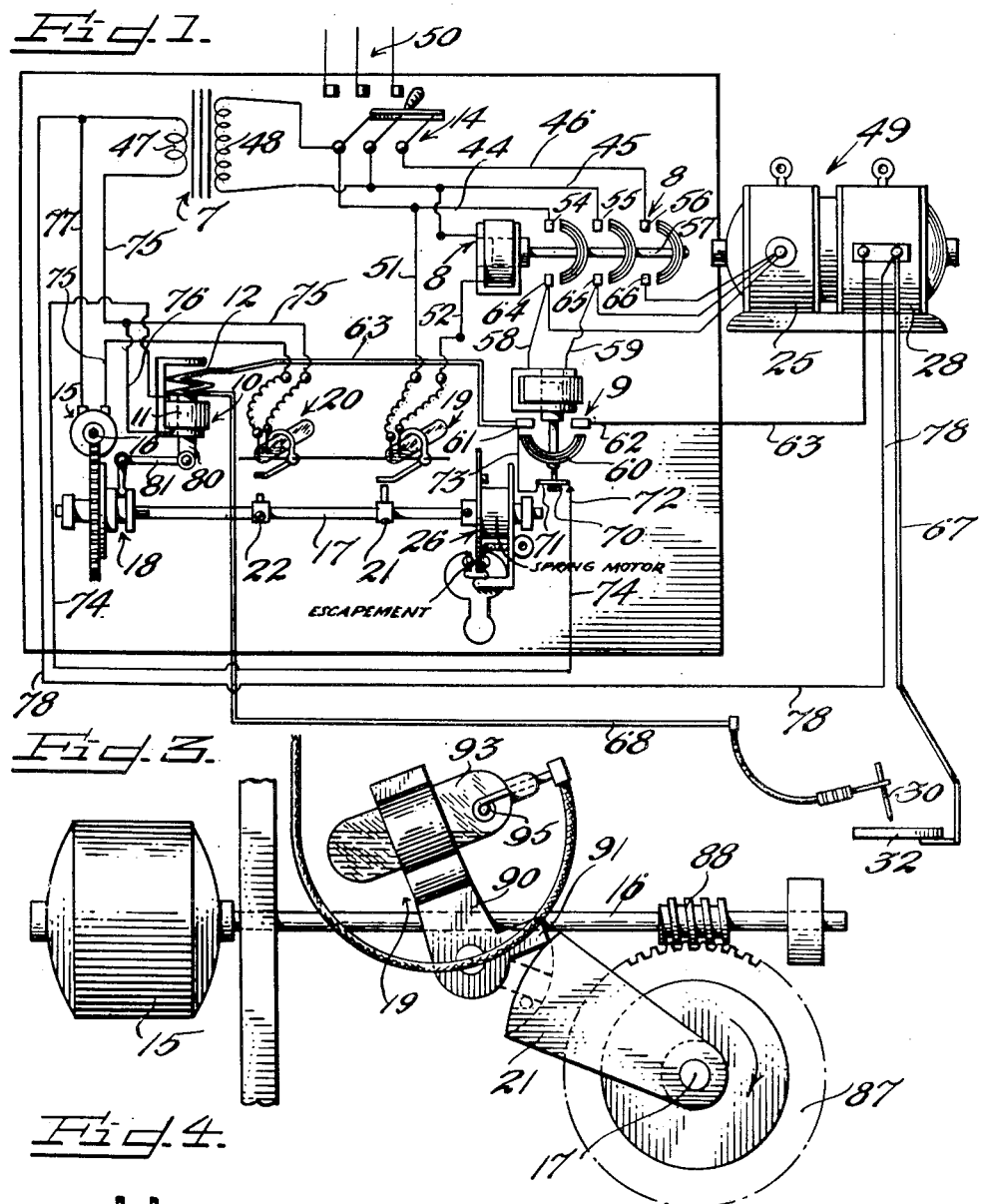
March 7, 1950    R. G. FERGUSON    2,499,635
AUTOMATIC SELF-STARTING AND STOPPING SYSTEM
FOR ARC WELDING INSTALLATIONS
Filed Aug. 3, 1946    2 Sheets-Sheet 1
Inventor
Rolland G. Ferguson.
By Clarence A. O'Brien
and Harvey B. Jacobson
Attorneys

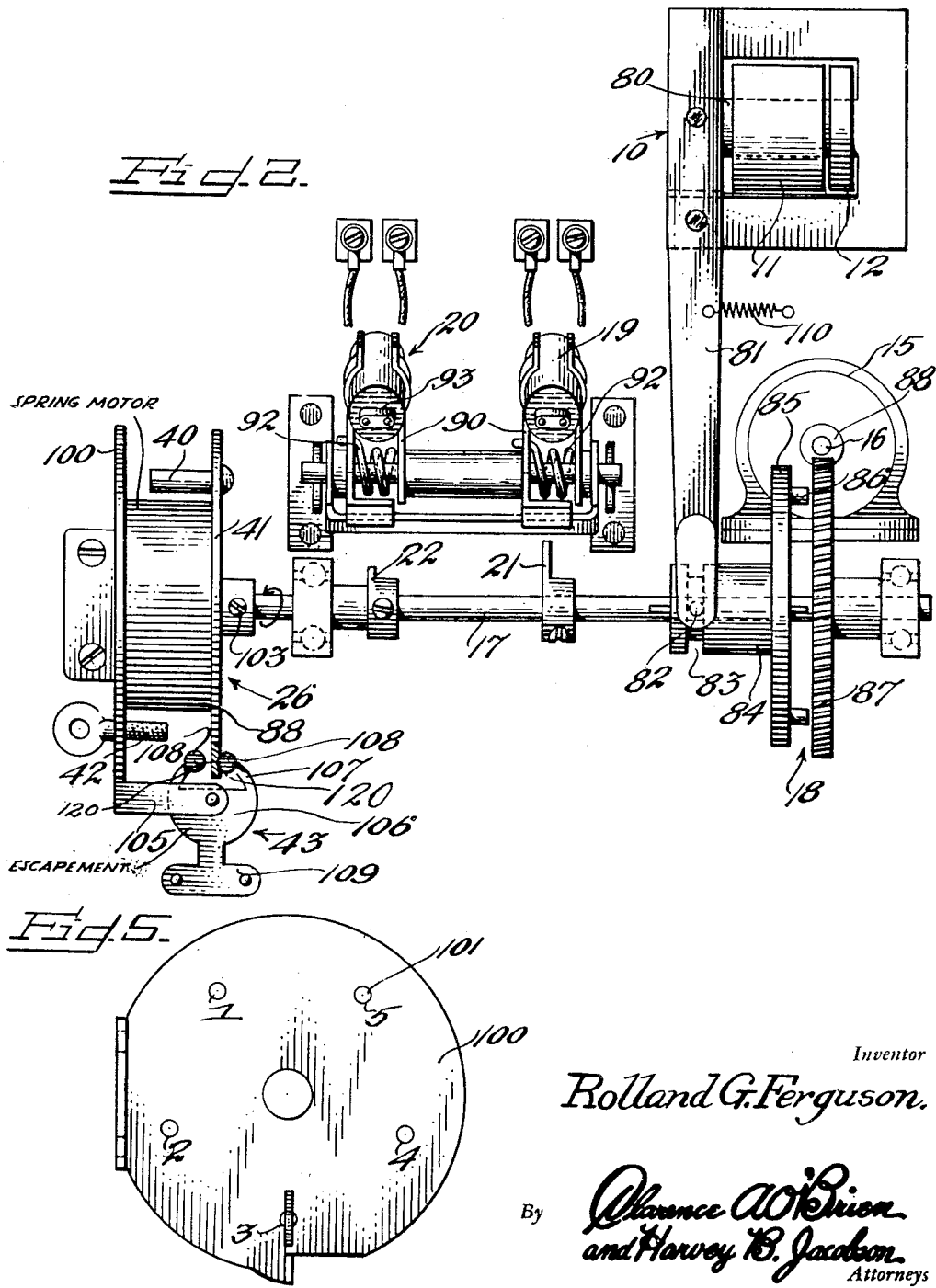

2,499,635

UNITED STATES PATENT OFFICE 2,499,635

AUTOMATIC SELF-STARTING AND STOPPING SYSTEM FOR ARC WELDING INSTALLATIONS

Rolland G. Ferguson, Tacoma, Wash.

Application August 3, 1946, Serial No. 688,320

7 Claims. (Cl. 322—11)

This invention relates to automatic starting and stopping systems for welding installations provided with a suitable motor generator and a welding circuit and rod, supplied with welding current from the generator of the motor generator, and it has for its general and principal object to provide a simple, effective and reliable automatic system which cuts current off from and deenergizes all the current consuming and current producing circuits of the installation shortly after the welder closes active operation and which again brings all the circuits into fully operative condition as soon as the welder wants to start operation by the simple act of contacting the welding rod with the work piece.

Installations in which either the one or the other operation is performed have been proposed; but it will easily be understood that automatic full deenergization of all current consuming circuits upon separation of the welding rod from the work, as a rule, excludes automatic self-starting upon the making of contact between the welding rod and the work piece without preliminary or additional operation.

According to the invention the above defined main object is realized by means of tiltable switches under control of a mechanical tilting device which may be coupled either with a mechanical or with an electric driving device. The former operates the switches so that they perform a complete cut-out operation, whenever the welding circuit becomes deenergized and remains so for a predetermined period. The second driving means is brought into operation when a portion of the welding circuit containing the welding rod is closed while the welding circuit is still open at the main control points and it operates the switches in such a way that all the circuits are again connected with the current supply.

A number of further and more specific objects and a number of further advantages will be apparent from the following specification.

The invention is illustrated in the accompanying drawings showing one specific embodiment of the same. It is, however, to be understood that this specific embodiment has been selected as an example for showing the way in which the principles forming the invention are to be applied in a specific practical case. The invention is described, using this example as a base, in such terms that any expert skilled in this art may be able to understand these principles fully and to apply them in any case, not only in the specific case used as an example and therefore other embodiments of the invention using the same principles are a part of the invention and not departures therefrom.

In the accompanying drawings:

Figure 1 is a diagrammatic view showing the devices used and their connections.

Figure 2 is an elevational front view of the switches and of the mechanisms by means of which they are operated.

Figure 3 is an elevational side view of the mechanisms shown in Figure 2.

Figure 4 is a detailed front view of one of the switches.

Figure 5 is a view of the time plate.

The arrangement, according to the invention, consists in an automatic start and stop system which cuts off the welding current and stops the generation of the same after a predetermined time interval, whenever the welder stops operations, and which again starts the operation of the welding current generator and cuts in the welding current when the welder starts his operation and applies his welding rod to the work piece.

Essentially the start and stop system according to the invention comprises an A. C. supply system 50 which furnishes the operating current for the various devices and mechanisms of the system and for the motor generator 49 which supplies the welding current for the welding rod 30. It moreover comprises a three pole electromagnetic switch 8, a one pole electro-magnetic switch 9, provided with idle contacts, a transformer 7 for supplying current to a synchronous motor 15, a clutch control electro-magnet 10, a number of tilting switches 19, 20 and a cam shaft 17 for tilting the switches and returning the same, coupled by means of a clutch 18, controlled by the aforesaid electro-magnet 10, with the synchronous motor 15, and a separate spring operated mechanical driving device 26 which is time-controlled for driving the shaft 17 in a direction opposite to that in which it is driven by motor 15. It moreover may comprise known means for the control of the welding current which are not described specifically.

The A. C. supply system 50 which is shown as a three phase system is connected with the welding system including the start and stop system by means of a three pole switch 14, two phase conductors of which are connected with the primary 48 of the transformer 7 while the three conductors 44, 45, 46 leading from switch 14 are connected with the contacts 54, 55, 56 respectively, of the three pole switch 8 which are connected with contacts 64, 65, 66 when the three pole switch has attracted its armature 57. The contacts 64, 65, 66 are in their turn connected with the motor 25 of the motor generator 49 and it will thus be clear that the electro-magnet 8 controls the current supply to the motor generator and cuts it out, when falling back into the position shown in which it is deenergized. The circuit 51, 52 of the electro-magnet 8 is controlled in its turn by switch 19 described below.

Contacts 64 and 65 in addition also control one pole electro-magnet switch 9 by means of conductors 58 and 59. This electro-magnetic switch controls the contacts 61, 62 of the D. C. welding circuit 63, 67, 68 shown in double lines in the drawings by means of its armature 60. It is also provided with an armature 70 controlling contacts 71 and 72 and bridging said contacts when deenergized. The circuit 73, 74, controlled by these contacts, branches off from conductor 63 and includes one of the coils 11 of the clutch control electro-magnet 10 to be described below.

The D. C. welding currents circulating through circuits 63, 67, 68 are produced in the generator 28 of the motor generator 49. Said circuit also contains the work piece 32 and the welding rod 30 and a further coil 12, consisting of a few turns only, of the clutch control magnet 10.

Clutch control magnet 10 is energized by the said two coils 11 and 12 already mentioned. The coil 12 is of heavy wire and has merely 1 to 3 turns; it is arranged in the D. C. welding circuit 63, 67, 68 in series with the welding rod 30. The coil 11 is an A. C. operated coil energized by the secondary 47 of the transformer 7 by means of conductors 75 and 76 and circuit 74, connected with conductor 63 of the welding circuit when electro-magnet 9 is deenergized, the return being provided by the sections 68 and 67 of the welding circuit, if the welding rod 30 is in contact with the work piece, and by conductor 78 connected with 67.

The armature 80 of clutch control magnet 10 operates a lever 81, which is under the tension of a spring 110, as shown in Figure 2 and which is provided with a pin 82 entering a groove 83 in the sleeve 84. The latter is fixedly connected with the coupling disk 85 and keyed to cam shaft 17. By means of pins 86 entering into depressions or holes on the second coupling disk which in this case is formed by a worm wheel 87 loosely mounted on cam shaft 17, the sleeve 84 and shaft 17 may be coupled with the worm wheel. Such a coupling occurs only as long as magnet 10 is not energized. Manifestly other known coupling means may be employed, the coupling pins 86 being merely shown as an example.

The worm wheel 87 is driven by a worm 88 carried by a shaft 16 which in its turn is rotated by synchronous motor 15, energized from the secondary coil 47 of the transformer 7 by means of conductors 77 and 75. This circuit as will be seen in Figure 1 is controlled by one of the tilting switches 20.

The cam shaft 17 carries at least two cams 21, 22 for operating the switches 19, 20. The switches are preferably mercury switches of the type called "Mercoid" and consist of a glass container 93 into which electrodes 95 have been fused. Each switch may assume two positions in one of which the mercury surrounds and bridges the electrodes, while in the second position the electrodes are lifted out of the mercury. The switches are closed when not rocked and tilted by the mechanism described below. These switches are carried by a frame 90 which is rockable around a pintle. The frame has a projecting nose 91 which may be engaged by the cam 21 (or 22) and which turns the frame around. A torsion spring 92 returns the frame and switch into its position of rest.

Two tiltable switches are shown in the drawings but it is to be understood that their number depends on the number of circuits to be controlled. Switch 19 controls the energizing circuit 51, 52 of magnet 8 while switch 20 controls circuit 75 of motor 15.

The cam shaft 17 is, moreover, under the control of a mechanical drive 26, which comprises a spring drum 88 and a time adjustment disk 100 (Figure 5) provided with threaded holes 101 into which a pin 42 may be inserted. The drum 88 and the disk 100 are fixed. The spring in the drum 88 (not shown) is connected with the shaft 17 and drives the same in a direction opposite to that in which it is driven by the synchronous motor 15. This direction is marked by the arrow in Figure 2. The disk 41 which is connected with the cam shaft 17 by means of a set screw 103 carries a pin 40 which is stopped by pin 42, when the latter is screwed into one of the holes.

It is clear that the angular distance through which the torsion spring will turn shaft 17 depends on the position of pin 42. In Figure 5, five holes 1, 2, 3, 4, 5 are shown, into which pin 42 may be screwed, the numbers indicating, for instance, the number of minutes it will take for the motor 15 to turn shaft 17 to the point in which cams 22 and 21 will tilt the mercury switches and deenergize the installation.

To retard the movement of the cam shaft 17 sufficiently to prevent damage when shaft 17 is brought under the influence of the torsion spring of drum 88, an escapement device 43 is provided which is mounted on an arm 105 projecting from disk 100. At the end of the arm, just beneath the rotating disk 41, a forked escapement lever 106 is fulcrumed, the prongs 107 of which carry rollers 108, while the rear portion of the escapement lever is connected with a pendulum (not shown) fixed to the transverse arm 109.

The disk 41 is provided with notches or depressions 120 into which the rollers 108 of the escapement lever enter. The disk 41 therefore, when driven by the spring, performs a controlled rotation regulated by the pendulum by means of the escapement mechanism.

The operation of the start and stop system will be readily understood from the above description.

When the switch 14 is thrown into operative position, the welder is provided with welding current, magnets 8 and 9 being energized in the position of the switches 19 as shown. Simultaneously the motor 15 is supplied with current by means of secondary 47 of transformer 7. The speed of the motor and the gear ratio of the toothed and worm wheels driving the shaft 17 are so chosen that the said shaft makes one complete revolution in a certain number of minutes, say in 6 minutes to give an example.

As long as welding current is flowing through the welding circuit, magnet 10 is energized by means of coil 12 and shaft 17 is therefore not rotated by motor 15.

When the welder stops work, the magnet 10 does not hold the clutch 18 out of engagement, the shaft 17 is coupled with the motor 15 and starts to turn. After some time, the cam 21 tilts mercury switch 19 thereby interrupting the current 51, 52 of magnet 8. The armature 57 of said magnet falls back thereby interrupting circuits 44, 45, 46 at contacts 54, 64; 55, 65; moreover circuit 58, 59 of magnet 9 is interrupted and armature 60 falls back. The current of the motor generator and the welding current are then both interrupted after a predetermined time interval. The rotation of shaft 17 also tensions the torsion spring in drum 88.

When the shaft 17 continues to rotate the cam 22 tilts switch 20 and the circuit 75, 77 of motor 15 is interrupted. Since the gearing 37, 88 is irreversible the spring motor cannot turn the shaft in a wrong direction in which switch 20 would be closed.

The entire arrangement is now at rest.

When the welder intends to restart the welding operation, he contacts the welding rod 30 with work piece 32. A current is thereby set up from secondary 47 of transformer 7, the primary 48 of which is permanently connected with the network through switch 14, through conductor 78, conductor 67, work piece 32, welding rod 30, conductor 68, coil 12, conductor 63, conductor 73, armature 70, and contacts 71 and 72, conductor 74, winding 11 of magnet 10, conductors 76 and 75 back to secondary coil 47. Magnet 10 is energized and releases the coupling 18. Thereby the shaft 17 is now driven under the influence of the spring drum 88 in a direction opposite to that in which it was turned by motor 15. This rotation continues under the influence of the escapement until stop 40 meets the time stop 42. During this rotation the cam shaft is turned back and the mercury switches are freed and return to the positions shown in Figure 1 under the influence of their springs.

When the original position is reached the magnets 8 and 9 are again energized and the welding operation starts again.

It will be clear that the welding machine will not be allowed to run for any length of time exceeding a short interval which may be adjusted properly, while no actual welding operation is performed. The starting and stopping of the welding machinery is fully automatic and the welder's special attention is not required, as the act of stopping and starting the operation will indirectly also control the operation of the entire equipment.

It will be clear that the specific combination of the details by means of which the operations are performed, is not essential and that changes of the construction will not involve a departure from the essence of the invention.

I claim:

1. An automatic starting and stopping system for the motor generator of a welder with a work circuit closed and opened by an operator, comprising a current supplying network, electromagnetic switches controlling the supply of current from the network to the motor generator and the current produced by the motor generator, a tiltable automatically operated switch for controlling said electro-magnetic switches, means for automatically operating said tiltable switch, said means including a switch tilting device, a tilting shaft driving the same, a synchronous electromotor supplied with current from the network supplying the motor generator, means for driving said tilting shaft by the electromotor, said means including an electromotor shaft and a coupling between said electromotor shaft and the tilting shaft, electro-magnetically controlled by the current flow through the work circuit, holding said coupling out of engagement with the tilting shaft when current is flowing through said work circuit and time-controlled mechanical means for driving the tilting shaft upon disengagement of the aforesaid coupling in order to restore said switch tilting device and the tiltable switch to their original position.

2. An automatic starting and stopping system for the motor generator of a welder with a work circuit manually closed and opened by an operator for initiating the starting and stopping operation, comprising a current supplying network, electro-magnetic switches controlling the supply of current from the network to the motor generator and the current generated by the motor generator, a tiltable switch for controlling said electro-magnetic switches, a tilting device for the tiltable switch, including a tilting shaft, an electromotor, an electromotor shaft, and a coupling between said electromotor shaft and said tilting shaft, an electromagnet having a winding arranged in the work circuit for operating said coupling and for holding said coupling out of engagement with the tilting shaft when the electromagnet is energized, and time-controlled mechanical means for driving said shaft in a direction opposite to the direction of driving by the electromotor when the coupling is out of engagement for restoring said tilting device and the tiltable switch to their original position.

3. An automatic starting and stopping system for the motor generator of a welder with a work circuit manually closed and opened by an operator, comprising a current supplying network, electromagnetic switches controlling the supply of current from said network to said motor generator and the current supplied by the said motor generator, a tiltable switch for controlling said electromagnetic switches, a tilting device for said tiltable switch, including a tilting shaft, an electromotor for driving said shaft, connected with the current supplying network, a further normally closed tiltable switch operated conjointly with the first-named tiltable switch, by said tilting device, said further switch controlling the connection of said electromotor with said network, an electromotor shaft, a coupling between said electromotor shaft and said tilting shaft, an electromagnet having a winding arranged in the work circuit for operating said coupling, holding said coupling out of engagement when energized, and time-controlled mechanical means coupled with said tilting shaft for driving said shaft in a direction opposite to the direction of driving by the electromotor when said tilting shaft coupling is disengaged for restoring the tilting means and the tiltable switches to their original position.

4. An automatic starting and stopping system for the motor generators of a welder with a work circuit manually closed and opened by an operator for initiating the starting and stopping operation, comprising a current supplying network, electromagnetic switches controlling the supply of current from the network to the motor generator and the current generated by the motor generator, a tiltable automatically operated switch for controlling said electromagnetic switches, a tilting device for said tiltable switch, including a tilting shaft, an electromotor connected with the current supplying network, for driving the tilting shaft, an electromotor shaft, a further tiltable switch, operated conjointly with the first named tiltable switch, by said tilting device, for controlling the connection of said electromotor with the network, a coupling between said electromotor shaft and said tilting shaft, an electromagnet having a double winding for operating said coupling, one of said windings being arranged in the work circuit, the other winding being arranged in a separate circuit directly connected with the network and including the first-named winding and a portion of the work circuit, said electromagnet when energized holding the coupling between the electromotor shaft and the tilting shaft in a disengaged position, and time-controlled mechanical means coupled with said tilting shaft for driving said tilting shaft in a direction opposite to the direction of driving by the electromotor when the coupling between the electromotor shaft and the tilting shaft is disengaged for restoring said tilting means and the tiltable switches to their original position.

5. An automatic starting and stopping system for the motor generator of a welder with a work circuit manually closed and opened by an operator, comprising a current supplying network, electromagnetic switches controlling the supply of current from the network to the motor generator and the current produced in the motor generator, one of said switches being provided with rest contacts, operative circuits for said electromagnetic switches, a tiltable automatically operated switch for controlling said electromagnetic switches, closing the operative circuits of the electromagnetic switches in its original position, a tilting shaft for tilting said automatically operated tilting switch, tilting cams carried by said shaft, one of said cams operating the aforesaid tiltable switch, an electromotor for driving said tilting shaft, connected with the current supplying network, a further tiltable automatically operated switch, tilted by one of the cams on said shaft, said further tiltable switch controlling the connection of the network with the electromotor, an electromotor shaft, a coupling between said electromotor shaft and said tilting shaft, a coupling electromagnet for disconnecting said coupling upon energization, said coupling electromagnet being provided with two windings, one of said windings being included in the work circuit and a second winding being connected with the current supplying network by means of a circuit including a portion of the work circuit, closable by the operator and the rest contacts of the electromagnetic switches, controlling the current supply to and from the motor generator, said coupling electromagnet being operative solely upon the starting of the operation in the work circuit, and time-controlled mechanical means coupled with and driving the tilting shaft in a direction opposite to the direction of driving by the electromotor upon disengagement of the coupling between said electromotor shaft and the tilting shaft for restoring the tiltable switches and the tilting cams to their original position.

6. An automatic starting and stopping system for the motor generator of a welder with a work circuit manually closed and opened by an operator as claimed in claim 1, wherein the time controlled mechanical means include a spring operated drum connected with the tilting shaft and an escapement device regulating the rate of speed of the driving of the tilting shaft by the said spring operated drum.

7. An automatic starting and stopping system for the motor generator of a welder with a work circuit manually closed and opened by an operator, comprising a current supplying network, electromagnetic switches controlling the supply of current from said network to said motor generator, and further controlling the current generated by the motor generator, a tiltable automatically operated switch for controlling said electromagnetic switches, a tilting device for said tiltable switch, including a tilting shaft, an electromotor, an electromotor shaft, and a coupling between said electromotor shaft and the tilting shaft, an electromagnet having a winding arranged in the work circuit for operating said coupling and, when energized, for holding it in its disengaged position, a spring operated drum connected with the tilting shaft, driving the same upon disengagement of the coupling between the tilting shaft and the electromotor shaft, an escapement device cooperating with the drum for regulating the speed of the driving of the tilting shaft by the spring operated drum, a pin on said drum and a fixed pin cooperating therewith for selectively limiting the extent of the movement of the shaft and the time lag between the first flow of current in the work circuit and the full energization of the work circuit through return of the tilting switches into their original position energizing the electromagnetic switches controlling the motor generator.

ROLLAND G. FERGUSON.

REFERENCES CITED

The following references are of record in the file of this patent:

UNITED STATES PATENTS

| Number | Name | Date |
|---|---|---|
| 2,023,051 | Jones | Dec. 3, 1935 |
| 2,049,377 | Hobart | July 28, 1936 |
| 2,135,045 | Blankenbuehler | Nov. 1, 1938 |
| 2,170,861 | Hobart | Aug. 29, 1939 |
| 2,328,596 | Winsor | Sept. 7, 1943 |